United States Patent

Richards et al.

Patent Number: 5,951,434
Date of Patent: Sep. 14, 1999

[54] PLANETARY GEAR TRANSMISSION FOR A LIGHT VEHICLE SUCH AS A MOTORCYCLE

[76] Inventors: Victor Richards; George Folprecht, both of c/o 2276 Dixie Road, Mississauga, Ontario, Canada, L4Y 1Z4

[21] Appl. No.: 09/144,630

[22] Filed: Aug. 31, 1998

[51] Int. Cl.$^6$ .................................................. F16H 3/44
[52] U.S. Cl. ........................ 475/284; 475/288; 475/296; 475/311; 475/323
[58] Field of Search .................................... 475/269, 277, 475/284, 288, 296, 311, 323

[56] References Cited

U.S. PATENT DOCUMENTS

| | | | |
|---|---|---|---|
| 2,518,824 | 8/1950 | Simpson | 475/284 |
| 2,822,706 | 2/1958 | Miller | 475/284 |
| 2,873,625 | 2/1959 | Simpson | 475/284 |
| 4,621,227 | 11/1986 | Yamamori et al. | 475/284 X |

FOREIGN PATENT DOCUMENTS 229723  10/1963  Austria ................................ 475/284

*Primary Examiner*—Rodney H. Bonck
*Assistant Examiner*—Ankur Parekh
*Attorney, Agent, or Firm*—Riches, McKenzie & Herbert

[57] ABSTRACT

A transmission used as part of a drive unit to transmit power is coupled to a V6 engine drive shaft by a torque converter and includes an axially extending ring gear assembly, a sun gear positioned coaxially within part of the ring gear assembly and two planetary gear assemblies each spaced axially from the other and meshing with the sun gear and the ring gear assembly. The ring gear assembly is driven in rotation about its axis and an output drive shaft by the rotational forces of the motor output shaft and includes two different diameter annular ring gears which are each centered on and extend radially about the transmission axis. The annular ring gears have different diameters and radially inwardly extending teeth. The sun gear includes a portion axially aligned within each of the two ring gears. A clutch plate or pack, gearing or other band or pressure brake is provided to selectively permit or prevent the rotation of the sun gear about the transmission axis and relative to the output drive shaft. A first planetary gear assembly includes one or more planetary gear pinions meshing with the teeth of the smaller diameter ring gear and its axially aligned portion of the sun gear. The planetary gear pinions are each rotatably mounted to a first planetary carriage which in turn is coupled to the output drive shaft. The second other planetary gear assembly includes at least one second planetary gear pinion meshing with the teeth of the larger diameter ring gear and the portion of the sun gear aligned therein. The second planetary gear pinions are rotatably mounted to pivots coupled to a second gear carriage which in turn is selectively rotatable about the axis. A brake is provided operable to permit or prevent the rotation of one or both of the first planetary gear carriage or the second planetary gear carriage relative to their respective pivots. A second brake provided to selectively lock or unlock the sun gear so as to permit or prevent its rotation relative to the transmission axis.

18 Claims, 7 Drawing Sheets

PLANETARY GEAR TRANSMISSION FOR A LIGHT VEHICLE SUCH AS A MOTORCYCLE

SCOPE OF THE INVENTION

The present invention relates to a transmission, and more particularly to a compact transmission which is particularly suited for use in light vehicles such as motorcycles, snowmobiles, all terrain vehicles and the like.

BACKGROUND OF THE INVENTION

The use of transmissions in lightweight vehicles such as motorcycles, and all terrain vehicles (ATV's) is well known. Typically, motorcycles and ATV's have comparatively small engines of 1,400 cc's or less. The engines are in turn coupled to a drive shaft by means of a transmission. Conventional light vehicle transmissions are designed for smaller engine sizes, and heretofore have been poorly suited to provide full operation with larger engines providing increased torque forces.

To provide smaller light vehicles with increased power, various individuals have attempted to mount either a V6 or V8 automobile engine to reinforced motorcycle frames and the like. Space restrictions which occur in mounting larger V6 or V8 engine blocks on motorcycle frames have, however, necessitated the direct coupling of the engine crankshaft with a constant 1.5 low gear drive ratio with the drive shaft, without a transmission having multiple forward or reverse gears.

SUMMARY OF THE INVENTION

Accordingly, the present invention seeks to overcome the disadvantages of prior art by providing an improved compact transmission which is suitable for use on lightweight vehicles, and which provides multiple forward gears and at least one reverse gear.

Another object of the invention is to provide a compact transmission which may be used on different types of light vehicles such as motorcycles, snowmobiles, small tractors, carts, ATV's and the like, which may be mounted transversely to the vehicle engine crankshaft.

A further object of the invention is to provide a transmission which is sufficiently compact to permit its coupling to a V6 or V8 automobile engine which has been mounted to a light vehicle frame used for a motorcycle, snowmobile or ATV.

The present invention provides a transmission which may be used as part of a drive unit to transmit power from engines ranging in size from one hundred or more cubic centimeters to V6 or V8 automobile engines. The transmission is coupled to the engine crankshaft by a torque converter and includes an axially extending ring gear assembly, a sun gear positioned coaxially within part of the ring gear assembly and two planetary gear assemblies each spaced axially from the other and meshing with the sun gear and the ring gear assembly.

The ring gear assembly includes two different diameter annular ring gears which have radially inwardly extending teeth and are each centered on and extend radially about the transmission axis. The ring gear assembly is driven in rotation about its axis and an output drive shaft by the rotational forces of the motor crankshaft. The annular ring gears most preferably are fused or coupled to each other so that they are continuously driven in rotation with the engine output by spiral bevel gears.

The sun gear includes a portion axially aligned within each of the two ring gears. Clutch plates or packs, gearing or other band or pressure brakes are provided to selectively permit or prevent the rotation of the sun gear about both the transmission axis and relative to the output drive shaft.

A first one of the two planetary gear assemblies includes two or more planetary gear pinions interposed between and meshing with the teeth of the smaller diameter ring gear and its axially aligned portion of the sun gear. The first planetary gear pinions are each rotatably mounted on respective pivots coupled to a first planetary carriage. The first planetary carriage is rotatable about the transmission axis and in turn is coupled to the output drive shaft (also referred to as a cross shaft) which also is provided in alignment with the transmission axis.

The second other planetary gear assembly includes at least two second planetary gear pinions interposed and meshing with the teeth of the larger diameter ring gear and the portion of the sun gear aligned therein. The second planetary gear pinions are rotatably mounted to pivots coupled to a second gear carriage which in turn is selectively rotatable about the axis and the sun gear.

A gear brake, clutch, or gearing is provided which is selectively operable to permit or prevent the rotation of a second planetary gear carriage relative to the transmission axis.

The foregoing transmission construction may be used to couple the crankshaft of almost any size engine to a drive. In addition, the transmission components lend themselves to the construction of a compact, transversely mounted transmission particularly suited for light vehicle use. The spiral bevel gears may be used to enable the mounting of the transmission with the transmission axis and drive shaft in a perpendicular orientation relative to the engine crankshaft.

Accordingly in one aspect the present invention resides in a transmission comprising:

an axially elongated drive shaft, and a gear housing rotatably coupled to a drive, said transmission further comprising:

a first annular ring gear extending radially about the drive shaft and having a first diameter, a second annular ring gear extending radially about the drive shaft and having a second diameter selected larger than said first diameter, said second ring gear being axially spaced from said first ring gear, a sun gear axially disposed about at least part of said drive shaft and having a third radial diameter less than the first radial diameter, the sun gear including a first portion extending coaxially within the first ring gear and a second portion extending coaxially within said second ring gear, a plurality of first planetary gears interposed between and meshing with said first ring gear and said first portion of said sun gear, said first planetary gears mounted on a first planet carrier for driving said drive shaft, at least one second planetary gear interposed between and meshing with said second ring gear and said second portion of said sun gear, each of said second planetary gears being mounted to a second planet carrier selectively rotatable about said axis relative to said sun gear, clutch means to selectively permit or prevent the sun gear to rotate relative to the drive shaft, and carrier locking means selectively operable to lock the second planet carrier and to prevent its rotation relative said gear housing.

In another aspect, the present invention resides in a transmission comprising:

an axially elongated drive shaft, and a gear housing rotatably coupled to a drive, said transmission further comprising:
- a first annular ring gear extending radially about the drive shaft and having a first diameter,
- a second annular ring gear extending radially about the drive shaft and having a second diameter selected larger than said first diameter, said second ring gear being axially spaced from said first ring gear,
- a sun gear axially disposed about at least part of said drive shaft and having a third radial diameter less than the first radial diameter, the sun gear including a first hollow portion extending coaxially within the first ring gear and a second portion extending coaxially within said second ring gear,
- a plurality of first planetary gears interposed between and meshing with said first ring gear and said first portion of said sun gear, said first planetary gears mounted on a first planet carrier for driving said drive shaft,
- at least one second planetary gear interposed between and meshing with said second ring gear and said second portion of said sun gear, each of said second planetary gears being mounted to a second planet carrier selectively rotatable about said axis relative to said sun gear,
- clutch means to selectively permit or prevent the sun gear to rotate relative to the drive shaft gears, and
- carrier locking means selectively operable to lock the second planet carrier and to prevent its rotation relative said housing.

In a further aspect the present invention resides in a transmission comprising:

an axially elongated drive shaft, and a gear housing rotatably coupled to a drive, said transmission further comprising:
- a first annular ring gear extending radially about the drive shaft and having a first diameter,
- a second annular ring gear extending radially about the drive shaft and having a second diameter selected larger than said first diameter, said second ring gear being axially spaced from said first ring gear,
- a sun gear axially disposed about at least part of said drive shaft and having a third radial diameter less than the first radial diameter, the sun gear being rotatable about the axis and including a first portion extending coaxially within the first ring gear and a second portion extending coaxially within said second ring gear,
- a plurality of first planetary gears interposed between and meshing with said first ring gear and said first portion of said sun gear, said first planetary gears mounted on a first planet carrier linked to said drive shaft,
- a plurality of second planetary gears interposed between and meshing with said second ring gear and said second portion of said sun gear, each of said second planetary gears being mounted to a second planet carrier selectively rotatable about said axis relative to said sun gear,
- a gear lock selectively operable to lock the sun gear to prevent its rotation relative to the housing,
- a clutch to selectively permit or prevent the sun gear to rotate relative to the drive shaft, and
- a carrier lock selectively operable to lock the second planet carrier and to prevent its rotation relative said housing gear, wherein in operation, while the clutch and carrier lock are deactivated, the activation of the gear lock to prevent rotation of the sun gear relative to the housing results in the rotation of the first planetary gears and first planetary gear carrier thereabout to rotate the drive shaft in a first low gear, when the gear lock and carrier lock are deactivated, the activation of the clutch to prevent rotation of the sun gear relative to the drive shaft prevents the relative rotation of the first planetary gears and first planetary gear carrier relative to the sun gear, to rotate the sun gear, the first planetary gear carrier and the drive shaft together with the first ring gear in a second high gear, and when the gear lock and clutch lock are deactivated, the activation of the carrier lock results in the second planetary gears counter-rotating the sun gear at a faster rate than the rate of forward rotation of the first planetary gears, to move the first planetary gear carriage and drive shaft in a counter direction relative to said first ring gear.

BRIEF DESCRIPTION OF THE DRAWINGS

Further objects and advantages of the invention will appear from the following description taken together with the accompanying drawings, in which.

DETAILED DESCRIPTION OF THE DRAWINGS

Figure 1:
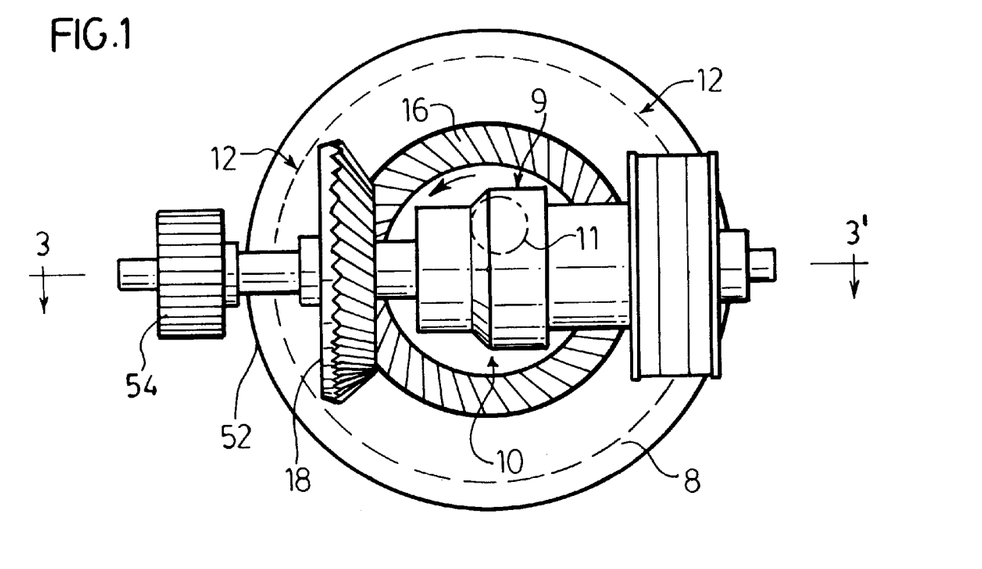
FIG. 1 is a perspective view of an automatic transmission mounted to an automobile engine in accordance with a preferred embodiment of the invention.
Figure 2:
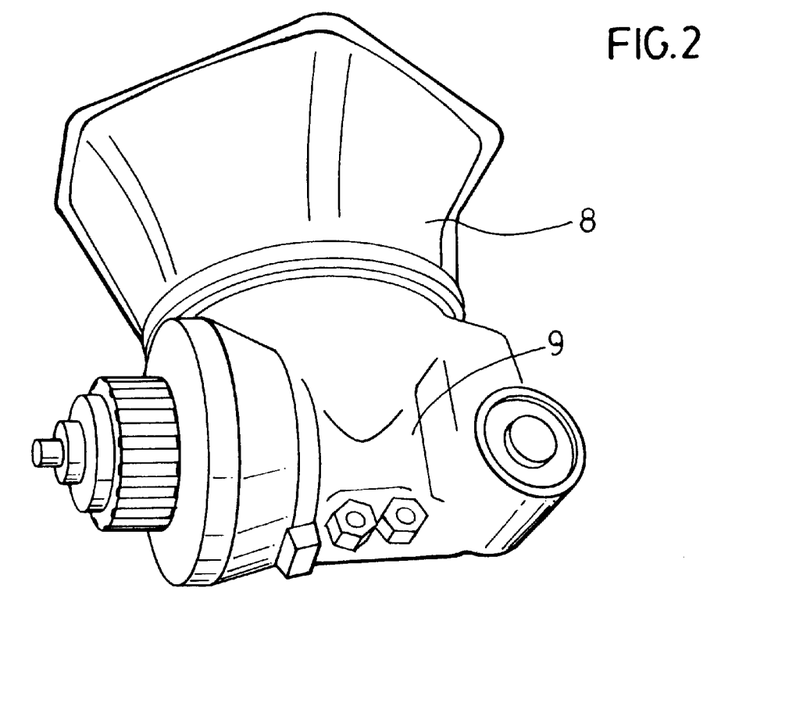
FIG. 2 is a perspective view of the transmission shown in FIG. 1.
Figure 3:
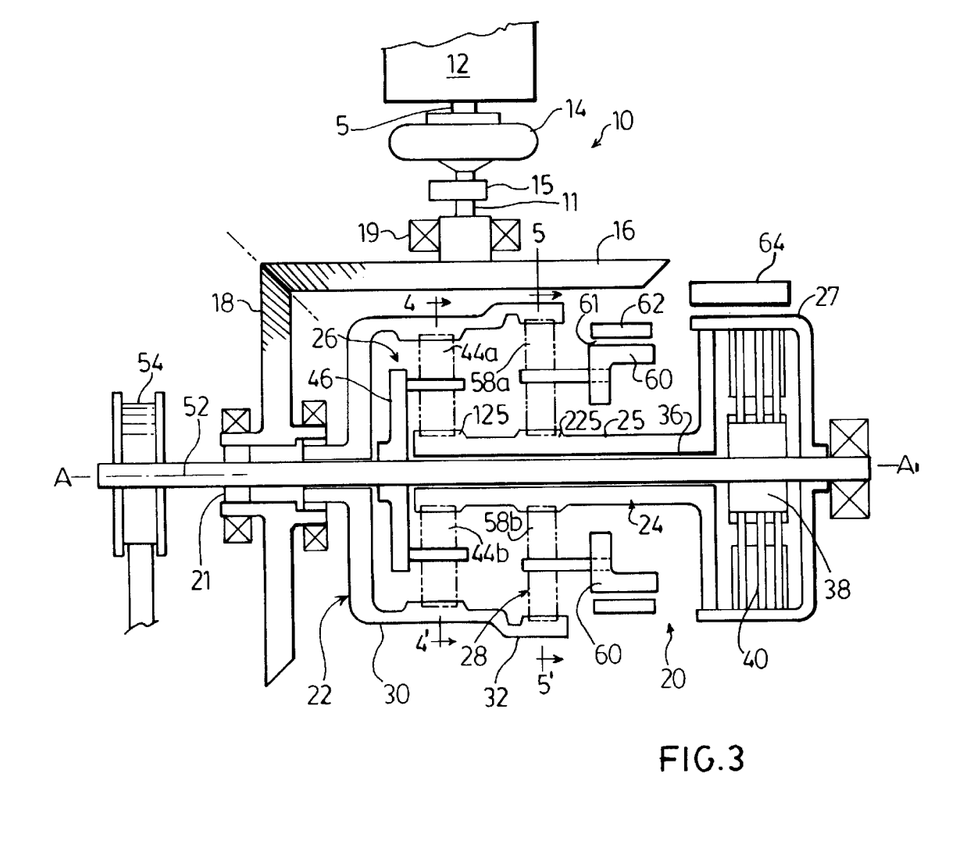
FIG. 3 is an enlarged cross-sectional view of the transmission of FIG. 1 taken along line 3—3.

FIGS. 1 and 2 show drive unit 10 which is adapted for use on a light vehicle (not shown) such as a motorcycle. The drive unit 10 is secured to the frame of the motorcycle which has been modified by replacing the conventional motorcycle engine by a small block V8 automobile engine 12. FIG. 2 shows the unit 10 as including a bell housing 8 which houses a torque converter 14 and hydraulic pump 15 (FIG. 3), and gear box housing 9 which houses a transmission 20. FIG. 3 shows best the drive unit 10 coupled to a crankshaft 11 from the motor 12 with each housing 8 and 9 removed. The torque converter 14 is provided with a reduced 10" diameter, for overall reduced profile. The oil pump 15 consists of spur gears 17 driven by the converter hub. The converter turbine drives an input shaft. The input shaft 11 extends through the converter turbine to drive a pair of spiral bevel gears 16,18, and supply power to the transmission 20.

The spiral bevel gears 16,18 are relatively large in diameter and narrow in cross section. The gears 16,18 set overall gearbox size and provide at the same time room for the transmission 20. The bevel gears 16,18 are in constant engagement connecting input shaft 11 from engine 12 to the transmission 20. The gear 16 has an internal spline used to connect it to the input shaft 11 and two bearing journals for suspension by Timken bearings 19. The input spiral bevel gear 16 is made from premium carburizing steel. The gear 16 is hardened and teeth are lapped. The driven spiral bevel gear 18 is similar to the gear 16. As shown best in FIG. 1, the spiral bevel gear 18 meshes directly and continuously with the spiral bevel gear 16. A needle roller bearing 21 (FIG. 3) is located in a bore at its outer side rotatably suspending the output drive shaft 52 (FIG. 3).

FIG. 3 shows best the transmission 20 as being elongated along a central axis A–A$_1$ which is oriented transversely to the orientation of the input shaft 11. The transmission 20 is used to drive the output shaft 52 and includes a ring gear assembly 22, an axially aligned elongate sun gear 24 and two planetary gear assemblies 26,28. As will be described hereafter, the output drive shaft 52 is mounted in a transverse position relative to the engine crankshaft 5 in a position co-axially with the axis A–A$_1$. The drive shaft 52 has coupled thereto a driving sprocket wheel 54 which transmits the engine 12 rotational forces to the vehicle wheels (not shown).

The ring gear assembly 22 is coupled directly to the spiral bevel gear 18, and operates in constant engagement with the input shaft 11 and torque converter turbine. In this configuration, the spiral bevel gear 18, ring gear assembly 22 and engine bevel gear 16 all rotate in constant engagement with the input shaft 11 while the engine 12 runs. The ring gear assembly 22 is of a two stage or double ring gear construction consisting of small and large diameter ring gears 30,32 which each extends radially about and is centered on the transmission axis A–A$_1$.

Figure 4:
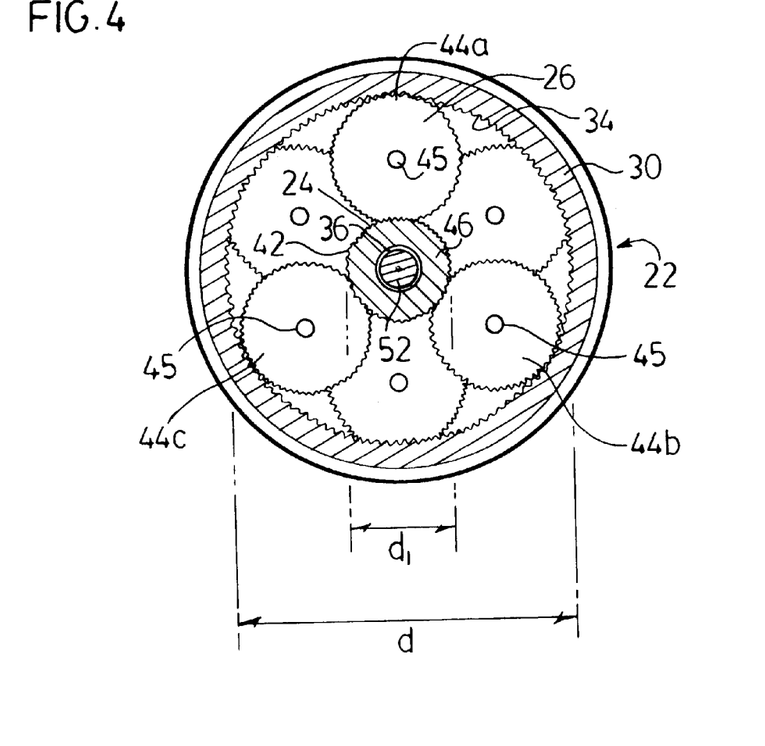
FIG. 4 is a cross-sectional view of the transmission shown in FIG. 3 taken along line 4—4.
Figure 5:
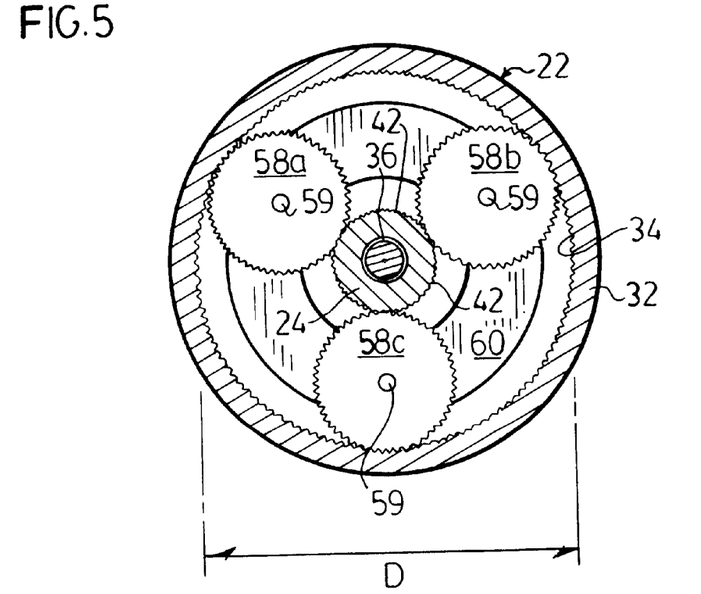
FIG. 5 is a cross-sectional view of the transmission shown in FIG. 3 taken along line 5—5.

As shown in FIGS. 4 and 5, the ring gears 30,32 are each provided with inwardly projecting helical teeth 34 along their radially inward facing surfaces, which preferably have generally the same tooth size and spacing. The ring gears 30,32 are fused to each other with the larger diameter ring gear 32 spaced axially adjacent to the smaller diameter ring gear 30. In this configuration, the rotation of the gear assembly 22 thus rotates both of the ring gears 30,32 as a single unit in a 1:1 ratio with the bevel gears 16,18.

The sun gear 24 is aligned with the axis A–A$_1$. The sun gear 24 is of a two stage design. The gear 24 comprises a hollow shaft 25 having first and second portions 125 and 225 respectively (FIG. 3) which are characterized by external teeth 42 (FIGS. 4 and 5), and an enlarged diameter cylindrical end portion 27 which is integrally formed with the shaft 25. The hollow shaft portion 25 has an external diameter which is smaller than the diameter d (FIG. 4) of the small ring gear 30. The shaft 25 extends from the first ring gear 30 through and outwardly beyond the second ring gear 32 to the end portion 27. The output shaft 52 is rotatably mounted within a bore 36, extending axially through the sun gear 24.

The sun gear 24 thus includes portions located within each of the ring gears 30,32 as pinions, each having radially outwardly projecting teeth 42 corresponding in size and profile to the teeth 34 on each of the ring gears 30,32. The portion of the sun gear 24 aligned with the ring gear 32 has equal or fewer the number of teeth as the portion of the sun gear which is aligned with the ring gear 30.

A drum 38 and plate clutch 40 are housed with the portion 27 and are used to couple or uncouple the sun gear 24 to the output shaft 52. The clutch 40 consists of six steel plates and five plates 5.250 inches in diameter which operates as friction inserts for high torque transmission. The drum 38 contains a piston and seals to clamp the clutch plates by hydraulic oil pressure transfer. The hydraulically operated plate clutch 40 is operated by means of manual and electrical controls (not shown) to selectively engage the drive shaft 52 and permit or prevent rotation of the sun gear 24 relative thereto.

As will be described, a first gear band brake 64 (FIG. 3) is also provided to selectively engage the external peripheral surface of the end portion 27 to hold the sun gear. The band brake 64 is thus operable by controls (not shown) to permit or prevent rotation of the sun gear 24 about the transmission axis A–A$_1$.

FIGS. 3 and 4 show best the first low gear planetary gear assembly 26 of the transmission 20. The first planetary gear assembly 26 includes a first set of three planetary gears or pinions 44a,44b,44c and a first assembly carriage 46. The first planetary gears 44a,44b,44c are rotatably mounted to respective pivots 45 coupled to the gear carriage 46 at equally radially spaced locations about the transmission axis A–A$_1$. The carrier 46 is in turn permanently coupled to the drive shaft 52 at the axis A–A$_1$ so as to rotate the drive shaft 52, and thereby the driven sprocket wheel 54 therewith. Each of the planetary gears 44a,44b,44c have a size and tooth profile selected for their complementary placement interposed and meshing with the teeth 34 of the small ring gear 30 and the teeth 42 on the portion of the sun gear 24 aligned therein.

FIG. 3 shows the drive shaft 52 as being axially elongated and positioned in part in the through bore 36 of the sun gear 24. In this orientation, the drive shaft 52 extends through the axial center of each of the ring gears 30,32, the sun gear 24 and each of the planetary gear assemblies 26,28.

FIGS. 3 and 5 show best the second reverse planetary gear assembly 28 as including a series of three secondary reverse planetary gears or pinions 58a,58b,58c and a second planetary gear carriage 60. The gears 58a,58b,58c are each provided at radially spaced locations about the axis A–A$_1$, interposed between and meshing with the teeth 34 on the ring gear 32 and the teeth 42 provided on the portion 25 of the sun gear 24 co-axially aligned therewith. The second planetary gears 58a,58b,58c are rotatably mounted to respective pivots 59 coupled to the gear carriage 60. The gear carriage 60 has a cylindrical outer profile and extends axially from the second ring gear 32 in a direction away from the first ring gear 30 to a remote cylindrical end portion 61 (FIG. 3) which is integrated with a brake drum 61. FIG. 3 shows a reverse gear band brake 62 as being provided to selectively engage the cylindrical end portion 61 as a drum brake. The band brake 62, like the clutch 40, is hydraulically operated and may be used to selectively prevent or permit rotation of the gear carrier 60 and the secondary gears 58a,58b,58c carried thereby about the transmission axis A–A$_1$.

Reference is now made to FIGS. 6 to 12 which show the operation of the planetary gears and the operation of the transmission 20.

Figure 6:
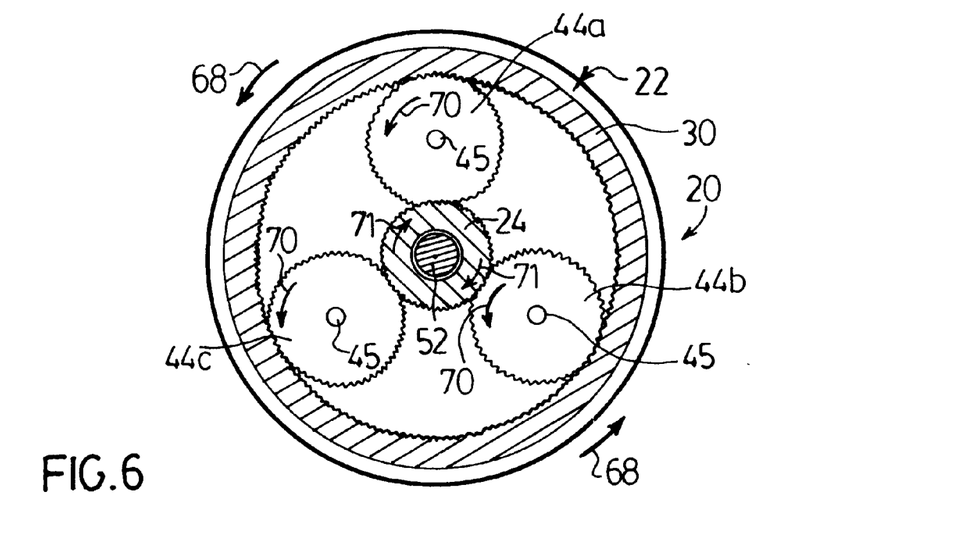
FIG. 6 is a cross-sectional view of the transmission shown in FIG. 4 showing the operation of the transmission in a neutral gear.

FIG. 6 shows the transmission 20 in a neutral gear configuration wherein the drive shaft 52 remains static. In neutral, the controls are set so that both drum brakes 62,64 and the plate clutch 40 are disengaged. The spiral bevel gear 18 is continually driven in forward rotation by its constant engagement with the bevel gear 16. The continuous rotation of the spiral bevel gear 18, therefore, continuously rotates the ring gear assembly 22 and the ring gears 30,32 about the transmission axis A–A$_1$ in the direction of arrows 68.

The release of the band brakes 62,64 permit unrestricted rotation of the second gear carriage 60 about the axis A–A$_1$ relative to the planetary gear assemblies 26,28. The disengagement of the clutch 40 also permits the sun gear 24 to rotate freely about both the axis A–A$_1$ and the drive shaft 52 as the ring gear assembly 22 rotates (shown by forward direction arrows 68). In this configuration, the planetary gears 44a,44b,44c (and 58a,58b,58c) are individually rotated about their respective pivots 45,59 in a similar forward direction of arrows 70. By reason of the planetary gears 44a,44b,44c and 58a,58b,58c meshing with the sun gear 24 and the ring gears 30,32, respectively, the forward rotation of the planetary gears 44a,44b,44c and 58a,58b,58c thereby rotates the unrestricted sun gear 24 in a counter or reverse direction about the axis A–A$_1$, of arrow 71, offsetting the rotational forces of the ring gear assembly 22. The free rotation of the sun gear 24 results in the static rotation of the first planetary gears 44a,44b,44c about their respective pivots 45, without rotating the first planetary gear carriage 46, or the drive shaft 52 which is coupled thereto.

Figure 7:
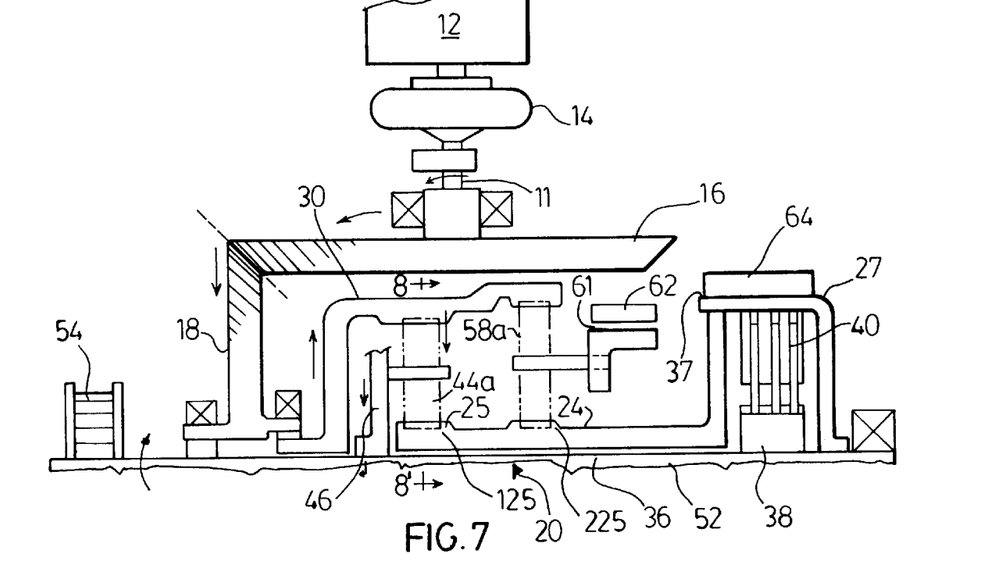
FIG. 7 is a partial cross-sectional view of the transmission shown in FIG. 3 showing the operation of the transmission in a first drive gear.
Figure 8:
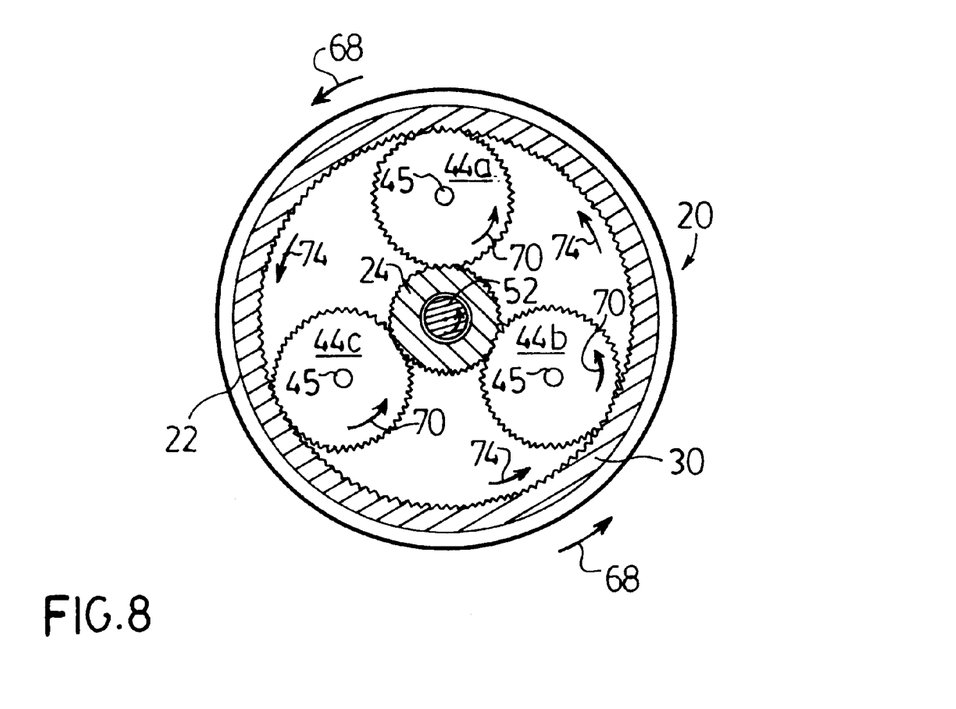
FIG. 8 is a schematic sectional view of the transmission gearing as shown in FIG. 7 taken along line 8–8' showing the operation of the transmission in a first drive gear.

FIGS. 7 and 8 show the transmission 20 as being used to drive the drive shaft 52 in a low forward gear. The controls (not shown) are used to activate the band brake 64, moving it into engagement with the outer periphery of the end 27 of the sun gear 24. The engagement of the band brake 64 with the sun gear 24 prevents its rotation about the axis A–A$_1$, while permitting unrestricted rotation of the drive shaft 52 in the bore 36. In this configuration, the band brake 62 remains released to permit the second gear carrier 60 to rotate freely about the axis A–A$_1$. The clutch 40 is also disengaged to permit the drive shaft 52 to rotate freely within the bore 36. When the rotation of the drum 27 is stopped, the sun gear 24 is also stopped from rotating relative to the casing 9. The first stage planetary carrier 46 rotates according to gear teeth ratio of internal ring gear 36 and the teeth 42 on the end 25 of the sun gear 24. Power flows from bevel gears 16,18 to the low ring gear 30 then to the planetary gears 44a–c and carrier 46. Because the carrier 46 is fixed with output shaft 56, power is transferred to the sprocket 54 and vehicle wheel.

In particular, because the sun gear 24 is fixed in position, the rotation of the ring gear assembly 22 in the direction of the arrows 68, rotates the ring gears 30,32 about the sun gear 24. The rotation of the ring gears 30,32 about the fixed sun gear 24 effects the rotation of the planetary gears 44a,44b, 44c and 58a,58b,58c about their respective pivots in the direction of arrows 70. The meshing engagement of the planetary gears 44a,44b,44c with the fixed sun gear 24, however, results in the rotation of the first planetary gear carrier 46 about the axis A–A$_1$ in the direction of arrow 74, as the planetary gears 44 move along the periphery of the sun gear 24. The rotation of the first planetary gear carriage 46 in turn rotates the drive shaft 52 to move the driving sprocket wheel 54 in a forward direction. The gear ratio of the number of teeth on the smaller ring gear 30 to that on the larger ring gear 32 is preferably selected so that the gear ratio in first gear is 1.5 to 1.

Figure 9:
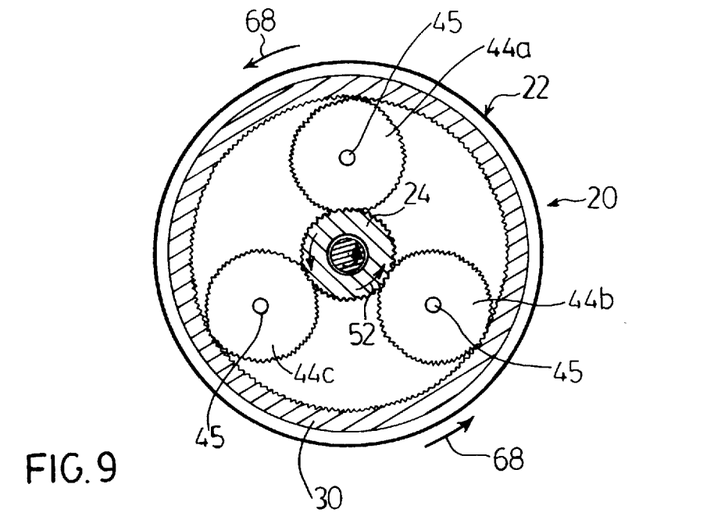
FIG. 9 is a schematic sectional view of the transmission gearing as shown in FIG. 8 showing the operation of the transmission in a second drive gear.

FIG. 9 shows the transmission with the drive shaft 52 in a high forward gear, in which the drive shaft 52 rotates about the axis A–A$_1$ in a 1:1 ratio with the spiral bevel gear 16. To move from low to high gear, the clutch 40 is engaged to lock the output shaft 52 to the sun gear 24. The arrangement effectively locks the sun gear 24 with the output shaft 56 which is already locked to the low planetary gear carrier 46. The result is, therefore, that the first smaller ring gear 30 and sun gear 24 rotate together about the axis A–A$_1$, along with the entire first planetary gear assembly 26. Since there is no relative rotation of the primary ring gear 30 relative to the sun gear 24, the primary planetary gears 44a,44b,44c do not rotate about their pivots 45. Rather, the primary planetary gear carriage 46 rotates with the ring gear assembly 22 as a single unit about the axis A–A$_1$, rotating the drive shaft 52 therewith. The result is the rotation of all parts around the axis A–A$_1$ in the direction of arrows 68 providing direct drive between input shaft 11 and output shaft 52 of the gearbox.

Figure 10:
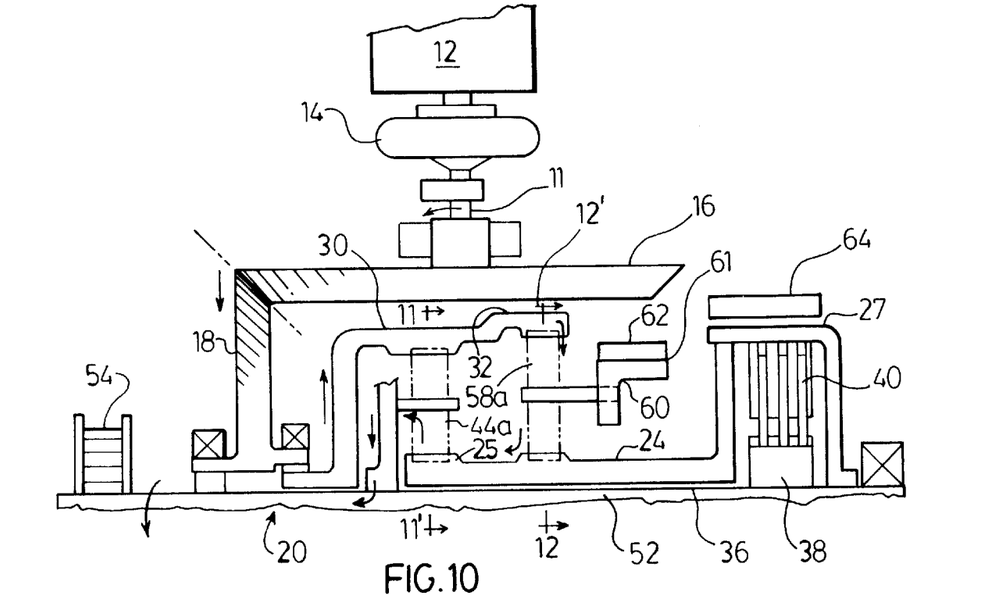
FIG. 10 is a partial cross-sectional view of the transmission shown in FIG. 7 taken along line 10–10' showing the operation of the transmission in a reverse gear.
Figure 11:
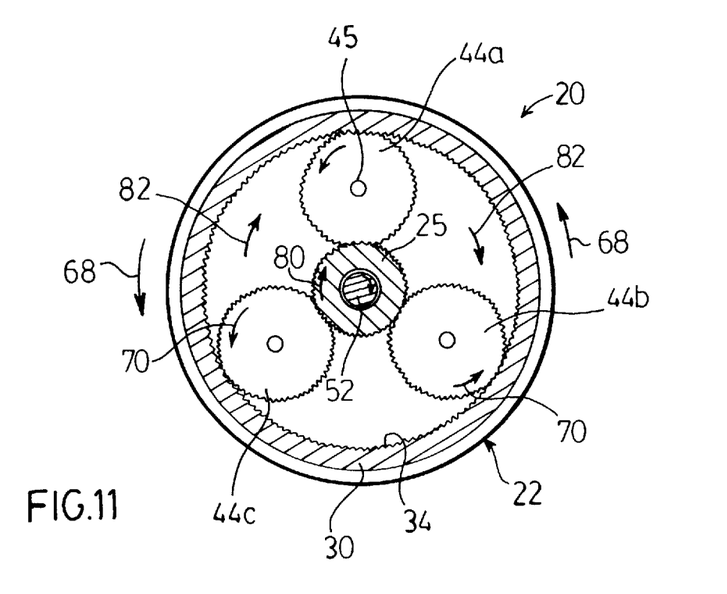
FIG. 11 shows a cross-sectional view of the transmission gearing as shown in FIG. 10 taken along line 11–11' showing the operation of the transmission in a reverse gear.
Figure 12:
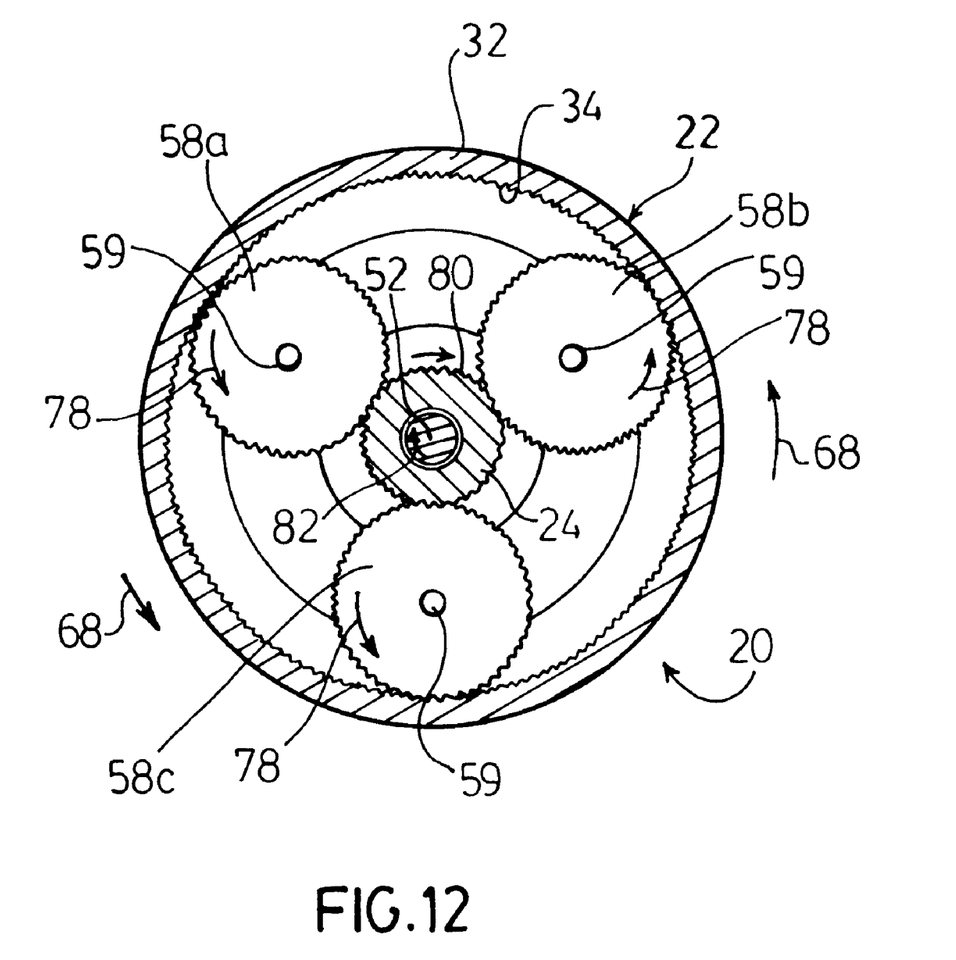
FIG. 12 shows a cross-sectional view of the transmission shown in FIG. 10 taken along line 12–12' showing the operation of the transmission in a reverse gear.

FIGS. 10 to 12 show the operation of the transmission 20 in a reverse gear. To reverse the drive shaft 52 and driving sprocket wheel 54, the gear brake 64 is released to permit rotation of the sun gear 24 about the axis A–A$_1$. The clutch 40 is also deactivated to release the sun gear 24 from the drive shaft 52 and permit its relative rotation thereto. The second band brake 62 is simultaneously activated to prevent rotation of the second reverse planetary gear carrier 60 about the axis A–A$_1$.

As the ring gear assembly 22 rotates in the direction shown by arrows 68, the secondary planetary gears 58a,58b, 58c rotate in the same direction shown by arrows 78. Because the secondary planetary gears 58a,58b,58c are fixed in their radial position relative to the axis A–A$_1$, their meshing engagement with the sun gear 24 causes its rotation in the opposite counter direction of arrow 80. The counter rotation of the portion 25 of the sun gear 24 which is aligned in the first ring gear 30 (shown in FIG. 11) rotates in the opposite direction to that of the first planetary gears 44a, 44b,44c (arrow 70) and first ring gear 30 (arrow 68). It is to be appreciated, that because of the increased diameter D (FIG. 5) of the second ring gear 32, compared to the diameter d (FIG. 4) of the first ring gear 30, the second planetary gears 58a–c rotate at a higher rate of revolution about their respective pivots 59 as compared to the first planetary gears 44a–c. The result is that the sun gear 24 is counter-rotated in the direction of arrow 80 by the counter-rotation of the secondary planetary gears 58a–c faster than the rate of forward rotation of the first planetary gears 44a–c. The first planetary gears 44a–c are therefor moved in the reverse direction of arrows 82 by the faster counter-rotation of the sun gear 24. The movement of the planetary gears 44a–c in the direction of arrow 82, thereby moves the planetary gear carriage 46 in the same reverse direction, to reverse the drive shaft 52 and driving sprocket wheel 54.

The transmission 20 preferably provides reverse gear of 11:1 ratio, which when combined with the sprocket drive, provides to the driving wheel reduction speed of approximately 23:1 ratio. The 11:1 transmission ratio is optimum for safe operation when operating the vehicle in reverse.

FIG. 1 shows the transmission as being transversely mounted to a V8 automobile engine 12, however, it is to be appreciated that other engine configurations may also be used without departing from the spirit and scope of the present invention. If desired, the transmission could be mounted in an orientation in line with the engine cam or crankshaft and without the spiral bevel gears. In addition, the transmission 10 is equally suited for use with a V6 engine, conventional motorcycle engines, or other engines used on motorcycles, ATV's, snowmobiles, lawn tractors, or other such light vehicles.

Although the detailed description of the description describes the transmission 20 as including a band brake 62 which is selectively operated to permit or prevent rotation of the second planetary gears 58a,58b,58c relative to the sun gear 24, the invention is not so limited. It is to be appreciated that a brake, clutch assembly or clutch pack could equally be configured to prevent rotation of the carrier 60 relative to the sun gear 24 to obtain an equal affect. Similar substitution may also be made with respect to the clutch 40 or brake band 64, The drive shaft 52 is shown extending axially through the sun gear bore 36 and from the transmission 20 to the drive sprocket wheel 54. It is to be appreciated that the invention is not so limited, and other drive shaft configurations are also possible.

Although the preferred embodiment of the invention discloses two sets of three planetary gears 44a,44b,44c and 58a,58b,58c mounted at locations spaced radially an equal distance from each other about the axis A–A$_1$, the invention is not so limited. If desired, a pair, or four or more planetary gears could be provided without departing from the spirit and scope of the present invention.

The preferred embodiment of the invention discloses band brakes 62,64 to achieve lockup of the sun gear 24 and second planetary gear carriage, other braking mechanisms are also possible including clutches, gearing and the like.

Although the detailed description describes various preferred embodiments, the invention is not so limited. Many variations and modifications will now occur to a person skilled in the art. For a definition of the invention, reference may be had to the appended claims.

We claim:

1. A transmission comprising:

an axially elongated drive shaft, and a gear housing rotatably coupled to a drive, said transmission further comprising:

a first annular ring gear extending radially about the drive shaft and having a first diameter, a second annular ring gear extending radially about the drive shaft and having a second diameter selected larger than said first diameter, said second ring gear being axially spaced from said first ring gear, a sun gear axially disposed about at least part of said drive shaft and having a third radial diameter less than the first radial diameter, the sun gear including a first portion extending coaxially within the first ring gear and a second portion extending coaxially within said second ring gear, a plurality of first planetary gears interposed between and meshing with said first ring gear and said first portion of said sun gear, said first planetary gears mounted on a first planet carrier for driving said drive shaft, a plurality of second planetary gears interposed between and meshing with said second ring gear and said second portion of said sun gear, each of said second planetary gears being mounted to a second planet carrier selectively rotatable about said axis relative to said sun gear, gear locking means selectively operable to lock the sun gear to prevent its rotation relative to said gear housing, and carrier locking means selectively operable to lock the second planet carrier and to prevent its rotation relative said gear housing, wherein said first ring gear and said second ring gear are fixedly coupled.

2. A transmission as claimed in claim 1 further comprising clutch means to selectively permit or prevent the sun gear to rotate relative to the drive shaft.

3. A transmission as claimed in claim 2 wherein the first and second portions of the sun gear each carry a plurality of gear teeth, and whereby the number of gear teeth on the first portion is equal to or greater than the number of teeth on the second portion.

4. A transmission as claimed in claim 1 wherein the second carriage includes a projecting portion extending axially from the second ring gear.

5. A transmission as claimed in claim 4 wherein the projecting portion comprises a drum and the carrier locking means comprises a band brake selectively operable to engage a periphery of said drum.

6. A transmission as claimed in claim 1 wherein the gear ratio of the first ring gear to the second ring gear is selected at about 1.5 to 1:1.

7. A transmission as claimed in claim 1 further including a spiral transmission bevel gear secured to said gear housing and said drive comprises a spiral engine bevel bear linked to an engine crankshaft, wherein said transmission bevel gear is in continuous meshing engagement with said engine bevel gear.

8. A transmission as claimed in claim 7 wherein said transmission bevel gear and said engine bevel gear rotate in a 1:1 ratio.

9. A transmission as claimed in claim 1 wherein said transmission is a small vehicle transmission selected from a snowmobile transmission, a motorcycle transmission, and an all-terrain vehicle transmission.

10. A transmission comprising:

an axially elongated drive shaft, and a gear housing rotatably coupled to a drive, said transmission further comprising:

a first annular ring gear extending radially about the drive shaft and having a first diameter, a second annular ring gear extending radially about the drive shaft and having a second diameter selected larger than said first diameter, said second ring gear being axially spaced from said first ring gear, a sun gear axially disposed about at least part of said drive shaft and having a third radial diameter less than the first radial diameter, the sun gear including a first portion extending coaxially within the first ring gear and a second portion extending coaxially within said second ring gear, a plurality of first planetary gears interposed between and meshing with said first ring gear and said first portion of said sun gear, said first planetary gears mounted on a first planet carrier for driving said drive shaft, a plurality of second planetary gears interposed between and meshing with said second ring gear and said second portion of said sun gear, each of said second planetary gears being mounted to a second planet carrier selectively rotatable about said axis relative to said sun gear, a gear lock selectively operable to lock the sun gear to prevent its rotation relative to the housing, a clutch to selectively permit or prevent the sun gear to rotate relative to the drive shaft, and a carrier lock selectively operable to lock the second planet carrier and to prevent its rotation relative said housing gear.

11. A transmission as claimed in claim 10 wherein the gear ratio of tie second ring gear to the second portion of the sun gear is selected at between about 5:1 and 20:1.

12. A transmission as claimed in claim 11 wherein the first and second portions of the sun gear each carry a plurality of gear teeth, and whereby the number of gear teeth on the first portion is equal to or greater than the number of teeth on the second portion.

13. A transmission as claimed in claim 1 wherein the first and second portions of the sun gear each carry a plurality of gear teeth, and whereby the number of gear teeth on the first portion is equal to or greater than the number of teeth on the second portion.

14. A transmission comprising:

an axially elongated drive shaft, and a gear housing rotatably coupled to a drive, said transmission further comprising:

a first annular ring gear extending radially about the drive shaft and having a first diameter, a second annular ring gear extending radially about the drive shaft and having a second diameter selected larger than said first diameter, said second ring gear being axially spaced from said first ring gear, a sun gear axially disposed about at least part of said drive shaft and having a third radial diameter less than the first radial diameter, the sun gear being rotatable about the axis and including a first portion extending coaxially within the first ring gear and a second portion extending coaxially within said second ring gear, a plurality of first planetary gears interposed between and meshing with said first ring gear and said first portion of said sun gear, said first planetary gears mounted on a first planet carrier linked to said drive shaft, a plurality of second planetary gears interposed between and meshing with said second ring gear and said second portion of said sun gear, each of said second planetary gears being mounted to a second planet carrier selectively rotatable about said axis relative to said sun gear, a gear lock selectively operable to lock the sun gear to prevent its rotation relative to the housing, a clutch to selectively permit or prevent the sun gear to rotate relative to the drive shaft, and a carrier lock selectively operable to lock the second planet carrier and to prevent its rotation relative said housing gear, wherein in operation, while the clutch and carrier lock are deactivated, the activation of the gear lock to prevent rotation of the sun gear relative to the housing results in the rotation of the first planetary gears and first planetary gear carrier thereabout to rotate the drive shaft in a first low gear, when the gear lock and carrier lock are deactivated, the activation of the clutch to prevent rotation of the sun gear relative to the drive shaft prevents the relative rotation of the first planetary gears and first planetary gear carrier relative to the sun gear, to rotate the sun gear, the first planetary gear carrier and the drive shaft together with the first ring gear in a second high gear, and when the gear lock and clutch lock are deactivated, the activation of the carrier lock results in the second planetary gears counter-rotating the sun gear at a faster rate than the rate of forward rotation of the first planetary gears, to move the first planetary gear carriage and drive shaft in a counter direction relative to said first ring gear.

15. A transmission as claimed in claim 14 wherein the first and second portions of the sun gear each carry a plurality of gear teeth, and whereby the number of gear teeth on the first portion is equal to or greater than the number of teeth on the second portion.

16. A transmission as claimed in claim 15 wherein the gear ratio of the first ring gear to the second ring gear is selected at about 1.5 to 1:1.

17. A transmission as claimed in claim 15 wherein said transmission is a small vehicle transmission selected from a snowmobile transmission, a motorcycle transmission, and an all-terrain vehicle transmission.

18. A transmission as claimed in claim 14 further including a spiral transmission bevel gear secured to said gear housing and said drive comprises a spiral engine bevel bear linked to an engine crankshaft, wherein said transmission bevel gear is in continuous meshing engagement with said engine bevel gear.

* * * * *